Sept. 20, 1971     J. W. WALKER     3,606,448
TRUCK BED COVER
Filed Aug. 29, 1969     2 Sheets-Sheet 1
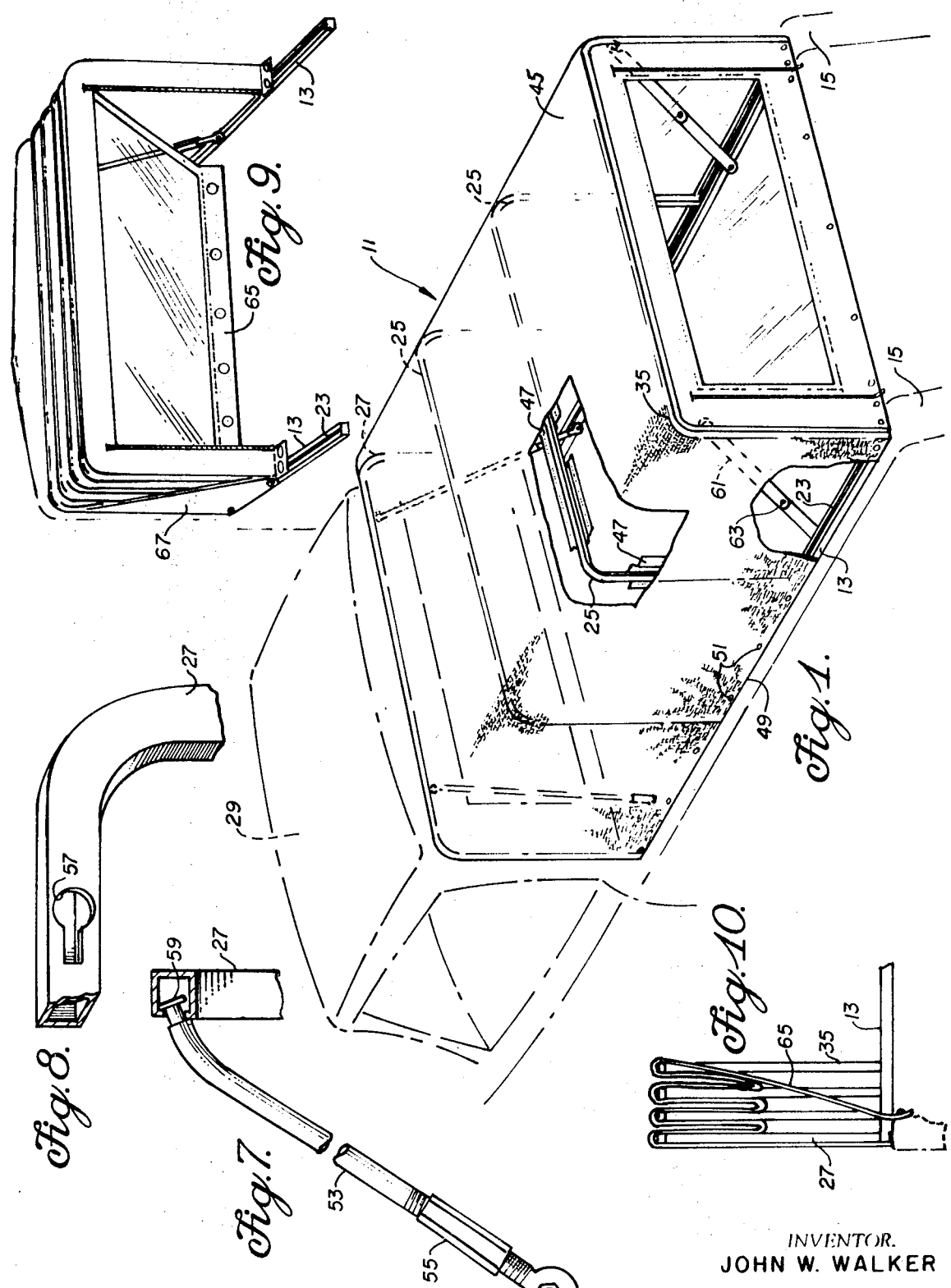
INVENTOR.
JOHN W. WALKER
BY
Bruce, McCoy & Tipton Sept. 20, 1971   J. W. WALKER   3,606,448
TRUCK BED COVER
Filed Aug. 29, 1969   2 Sheets-Sheet 2
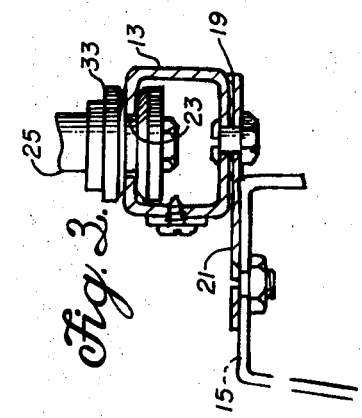
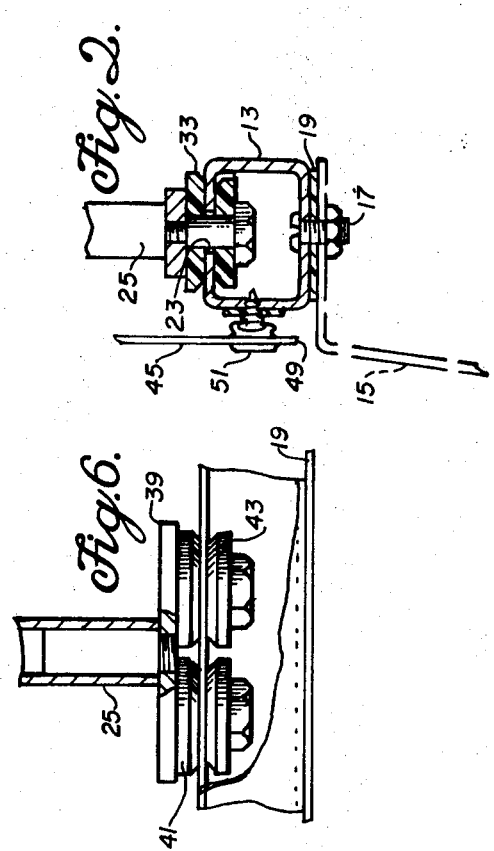
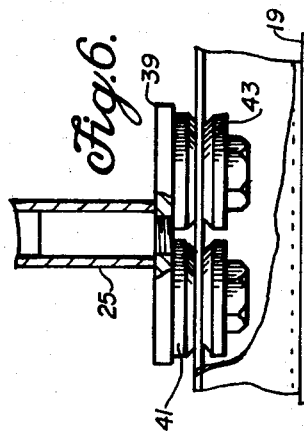
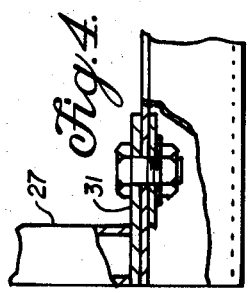
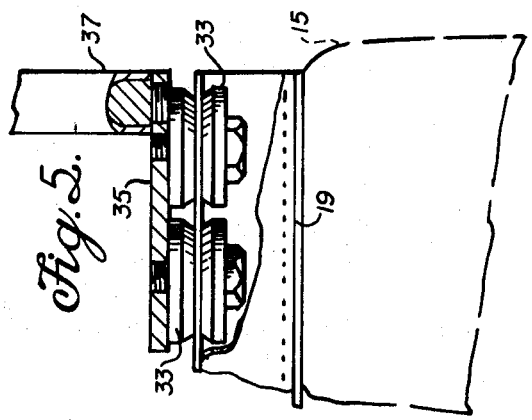
INVENTOR.
JOHN W. WALKER
BY
Bruce, McCoy & Tipton

United States Patent Office 3,606,448
Patented Sept. 20, 1971

3,606,448
TRUCK BED COVER
John W. Walker, Arroyo Grande, Calif., assignor to Jack Vincent Feather
Filed Aug. 29, 1969, Ser. No. 854,168
Int. Cl. B62d *25/00*
U.S. Cl. 296—105                                1 Claim

ABSTRACT OF THE DISCLOSURE

A collapsible pickup truck bed cover supported by U-shaped cover support bows having their lower ends slidably engaged to channel members secured to the rails of the truck bed.

BACKGROUND OF THE INVENTION

Field of the invention

The present invention relates to a truck bed cover and more particularly to a collapsible cover for pickup truck beds which can be easily and quickly retracted to a position adjacent the cab of the pickup truck.

Description of the prior art

Many collapsible truck bed covers have been designed for pickup trucks. In most instances, they involve such a complicated structure that they are impracticable in operation as well as being too expensive to market. An example of one of these, which is the closest prior art reference uncovered, is U.S. Pat. No. 3,201,171 for Retractable Truck Body Cover With Tension Control by H. A. Wickard. That patent shows a retractable truck body cover which utilizes a costly follower assembly for the support of the top bows. The hardware of Wickard is of special construction, while applicant's invention utilizes inexpensive commercially available parts and is of a much simpler construction, arrangement, and design.

SUMMARY OF THE INVENTION

Present invention is a collapsible truck bed cover which is designed specifically for use on pickup trucks. It comprises channel members which are secured to the rails of the truck bed and have slots extending the length thereof. A plurality of inverted U-shaped cover support bows are arranged with their lower ends engaged with the channel members to support the bows in an upright position. The forwardmost of the bows is secured in position while the remainder of the bows are slidably engaged with the channel members by means of a pair of peripherally grooved rollers disposed at each of the lower ends of said bows, the grooves of the rollers engaging the edges of the slots in the channel members. The rollers are mounted on foot plates secured to the lower ends of the bows. The rollers disposed at each of the lower ends of the rearward bow are mounted on the plates forward of the connection of the lower ends of the bow with the foot plate and the rollers disposed at each of the lower ends of the intermediate bows are mounted on the foot plates with one roller forward and one roller rearward of the connection of the lower end of the bows with the foot plates. A collapsible cover is secured to the support members.

The support for the cover also includes a pair of adjustable length bracing rods which have the lower ends of each engaged with the channel members rearward of the connection of the forward bow with the channel. The upper end of the bracing rods engage the upper end of the forward bow at a position between the rails of the truck bed. A pair of hinged lock bars are also provided which have their lower ends rotatably secured to the respective channel members forward of the rear ends of the channel members. The lock bars are angled upward and rearward and hooked over receiving members on the rearwardmost of the cover support bows to position the rear top bow when the cover is extended over the truck bed.

It is therefore an important object of the present invention to provide a collapsible truck bed cover of relatively simple construction and formed of relatively inexpensive parts;

It is another object of the present invention to provide a truck bed cover which can be easily and quickly extended or collapsed; and It is a further object of the present invention to provide a truck bed cover which can be easily removed from the truck.

DESCRIPTION OF THE DRAWINGS

FIG. 1 is a perspective view of the truck bed cover partially broken away to show the internal construction thereof;

FIG. 2 is an end view in section through the channel member which is mounted on the truck bed rail and through one of the rollers which is engaged therewith;

FIG. 3 is an alternative embodiment of the invention similar to FIG. 2 showing an alternative mounting of the channel member on the truck rail;

FIG. 4 is a side elevation in partial section of the front support bow engagement with the channel member;

FIG. 5 is a side elevation in partial section of the engagement of the rearwardmost support bow with the rearward end of the channel member;

FIG. 6 is a side elevation in partial section of the engagement of an intermediate support bow with the channel member;

FIG. 7 is a side elevation in partial section showing the bracing rods and the engagement of the upper end thereof with the front support bow;

FIG. 8 is a perspective view of a portion of the upper end of the right half of the front support bow showing the engagement hole for the bracing rods;

FIG. 9 is a perspective view of the truck bed cover in its collapsed configuration; and FIG. 10 is a side elevation in section of the collapsed truck bed cover.

DESCRIPTION OF THE PREFERRED EMBODIMENT

The collapsible truck bed cover 11 for pickup trucks of the present invention is shown in FIG. 1 of the drawings partially cut away. It includes a pair of channel members 13 which are secured to the rails 15 of the truck bed. In a normal width truck, the channel members can be secured directly to the top of the rail as shown in FIG. 2 by means of short bolts 17. A piece of weather-stripping 19 is usually inserted between the channel and the truck rail to prevent rail water from leaking into the truck and to prevent squeeking from mounting metal against metal.

On trucks that have wider than normal truck beds, the channels 13 can be secured to adapter plates 21 which in turn are secured to the truck rails 15 as shown in FIG. 3. Weatherstripping can also be inserted between both the truck rail and the adapter plate and between the adapter plate and the channel. The channels 13 of both designs include a horizontally disposed slot 23 in the upper surface of the channel. The arrangement of the slot in the upper surface of the channel permits easy and direct access to the bolts 17 which secure the channel to the truck rails or the adapter plate.

A plurality of inverted U-shaped support bows 24 are arranged with their lower ends engaged with the channel members 13 in such a manner so as to insure that the support bows are maintained in a relatively rigid upright position.

The forwardmost support bow 27, the one located at the front of the truck bed and closest to the cab 29 of the truck, is secured at the forward end of the channel member. In other words, it does not slide along the channel member as do the other support bows. The lower end of the forward support bow is provided with a foot plate 31 which extends rearward, or toward the back end of the truck, as shown in FIG. 4, and is secured to the channel member by a bolt which passes through a large washer within the channel.

The remainder of the support bows are all slidably engaged with the channel members. This is effected by a pair of horizontally disposed rollers 33 which are secured to each of the lower ends of the bows and engage the slots in the channel members. The engagement is effected by grooves which are formed around the periphery of the rollers and engage the edges of the slots in the channel members. The rollers are mounted on footplates 35 which are secured to the lower ends of each of the support bows as illustrated in FIGS. 5 and 6.

On rearwardmost support bow 37, the rollers 33 are both mounted on the footplate 35 forward of the connection of the lower ends of the support bow 37 with the footplate. This is shown in FIG. 5 which pictures the rear end of the channel member and the rear end of the truck rail.

The rollers which are mounted on the footplates 39 of the intermediate support bows, those bows other than the forward and rearward ones 27, 37, are mounted with one roller 41 forward and one roller 43 rearward of the connection of the lower ends of the support bows with the footplates 39 as shown in FIG. 6. The intermediate and rear bows are made of hollow tubing, and threaded plugs are secured in the lower ends thereof. The footplates are screwed onto the threaded studs of the plugs as shown in FIGS. 5 and 6.

It is obvious that the channel slots 23 could be disposed in the sides of the channels rather than in the top, with the footplates correspondingly mounted to the sides of the support bows, but then securing the channel members to the truck rails is slightly more difficult, because inserting the bolts and tightening thereof is made awkward.

A collapsible cover 45 made from any of the variety of convertible top or similar materials is secured to the support bows by conventional means; in the preferred embodiment, by sewn on pockets 47. The pockets can be made with one side comprised of snaps whereby the cover is easily removed from the support bows for cleaning, storage, or replacement. The lower edges 49 of the cover 45 are secured to the channel members 13 with snaps 51, as shown in FIGS. 1 and 2, to hold the cover in place when the cover is extended over the truck bed.

The cover support assembly is provided with a pair of adjustable length bracing rods 53, as shown in FIG. 7, for supporting the forward support bow 27. The lower ends of the rods are secured to the channel members and are provided with turnbuckle portions 55 so that the rods can be adjusted to extend or shorten for positioning the forward support bow vertically. The forward support bow is provided with a pair of horizontally arranged keyhole slots 57 disposed at the upper end in the horizontal portion thereof and at a position between the rails of the truck. The flanges 59 on the upper ends of the rods are inserted through the enlarged portions of the keyhole slots. The turnbuckle portions are then rotated to extend its rods and force the upper ends of the rods further inward toward the center of the truck and into the slot portions of the keyholes, thereby locking the rods in position. During installation of the cover, the rods are rotated around their pivot connection with the channel members to move the upper ends of the rods inward toward the center of the truck and upward.

The cover supporting assembly is also provided with a pair of hinged lock bars 61 shown in FIG. 1 which have their lower ends swivelly secured to their respective channel members. The hinges 63 permit the lock bars to be folded during storage when the cover is collapsed. The bars are angled upward and rearward to engage and support the rearwardmost support bow 37 when the cover is extended over the truck bed. The upper ends of the lock bars 61 are provided with hook slots which engage projecting pins on the support bow or which can engage slots formed in the rearward support bar.

FIGS. 9 and 10 show the cover in a collapsed or stowed configuration. To collapse the cover, it is only necessary to undo the snaps 51 and disengage the lock bars 61. Then one person can walk forward in the truck bed pushing on the rear support bow until the cover is stowed against the truck cab. It is then secured in position by snapping the rear flap 65 to the front rail of the truck bed. Side flaps 67 can also be provided, sewn to the front panel of the cover and stowable by folding them back between the cab and the cover, to snap to the rear support bow to keep the lower ends from creeping backward along the channel. The reverse procedure is naturally equally as simple.

To remove the cover completely from the truck is nearly as simple an operation. The snaps are undone; the lock bars disengaged; the bolts securing the front support bows to the channel members are lessened (wing nuts can be provided to facilitate this); the support bars retracted out of the keyhole slots by rotating the turnbuckles; and then the whole cover and support assembly can be slid rearward and out of the channels.

It is therefore obvious from the description of the invention in its preferred form that it will achieve all the objects attributable thereto and that it is an improvement in the art of collapsible truck bed covers. While the invention has been described in considerable detail, it is not to be limited to the preferred embodiment set forth.

I claim:
1. A truck bed cover comprising
channel members secured to the rails of said truck bed and having a horizontal slot disposed in the upper surface of each of said channel members and extending the length thereof,
a plurality of inverted U-shaped cover support bows arranged with their lower ends engaged with said channel members to support said bows in an upright position, the forwardmost of said bows being secured in position and the remainder of said bows being slidably engaged with said channel members by means of a pair of horizontally arranged peripherally grooved rollers disposed at each of the lower ends of said bows, the grooves of said rollers being engaged with the edges of said slots in said channel members and said rollers being mounted on footplates secured to the lower ends of said bows, the rollers disposed at each of the lower ends of said rearward bow being mounted on said plates forward of the connection of the lower end of the bow with the footplate and the rollers disposed at each of the lower ends of said intermediate bows being mounted on said footplates with one roller forward and one roller rearward of the connection of the lower ends of said bows with the footplates,
a collapsible cover secured to said support members,
a pair of adjustable length bracing rods having the lower ends thereof each engaging one of said channel members rearward of the connection of the forwardmost of said bows with said channel, the upper ends of said bracing rods engaging the upper end of said forwardmost bow at positions between the rails of said truck bed, and a pair of hinged lock bars having their lower ends rotatably secured to the respective channel members forward of the rear ends of said channel members, said lock bars angled upward and rearward and engaged with receiving means on the rearwardmost of said cover support bows.

References Cited

UNITED STATES PATENTS

| | | | |
|---|---|---|---|
| 2,239,888 | 4/1941 | Forrester | 296—105 |
| 2,513,152 | 6/1950 | Delivuk | 160—133 |
| 3,030,973 | 4/1962 | Janda et al. | 135—6 |
| 3,201,171 | 8/1965 | Wickard | 296—100 |
| 3,469,587 | 9/1969 | Folkes | 135—1 |

LEO FRIAGLIA, Primary Examiner

W. H. DOUGLAS, Assistant Examiner

U.S. Cl. X.R.

135—1A